United States Patent
Siecinski et al.

(10) Patent No.: US 6,206,392 B1
(45) Date of Patent: *Mar. 27, 2001

(54) STABILIZER BAR APPARATUS FOR USE IN A VEHICLE SUSPENSION

(75) Inventors: Douglas Siecinski, Livonia; Kenneth Mark Pickett; Sean Michael Steinman, both of Monroe, all of MI (US)

(73) Assignee: Visteon Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,338

(22) Filed: May 26, 1998

(51) Int. Cl.[7] .................................................. B60G 21/055
(52) U.S. Cl. ..................... 280/124.166; 280/796; 280/684; 280/124.13; 280/124.134; 267/273; 267/276; 138/121; 138/173
(58) Field of Search ...................... 280/796, 721, 280/124.134, 124.13, 124.137, 684, 679, 124.166; 267/273, 274, 276; 138/109, 121, 172, 173

(56) References Cited

U.S. PATENT DOCUMENTS

| | | | |
|---|---|---|---|
| 4,138,141 | 2/1979 | Andersen | 280/689 |
| 4,362,043 | 12/1982 | Hanson | 72/355.4 |
| 4,365,824 | * 12/1982 | Ohno et al. | 280/689 |
| 4,378,122 | 3/1983 | Ohno et al. | 280/689 |
| 4,429,899 | * 2/1984 | Ohno et al. | 280/689 |
| 4,612,695 | 9/1986 | Umeha et al. | 29/505 |
| 5,491,996 | * 2/1996 | Baarman et al. | 72/128 |
| 5,522,247 | 6/1996 | Mitsubayashi et al. | 72/302 |
| 5,829,769 | * 11/1998 | Hillqvist | 280/124.107 |

FOREIGN PATENT DOCUMENTS

| | | |
|---|---|---|
| 440840 | 2/1927 | (DE) . |
| 41-04-707-A1 | 8/1992 | (DE) . |
| 0-157-894-A1 | 10/1985 | (EP) . |
| 0-496-949-A1 | 8/1992 | (EP) . |
| 0-672-475-A1 | 9/1995 | (EP) . |
| 2-718-391-A1 | 10/1995 | (FR) . |
| 58-105816 | 6/1983 | (JP) . |
| 58-133909 | 8/1983 | (JP) . |
| 6182456 | 7/1994 | (JP) . |
| 9058246 | 3/1997 | (JP) . |
| 63287616 | 11/1998 | (JP) . |
| 85/00023 | 1/1985 | (WO) . |
| 9113707 | 9/1991 | (WO) . |
| 94-26437 | 11/1994 | (WO) . |

OTHER PUBLICATIONS

1997 Crown Victoria Grand Marquis, Service Manual, Jul., 1996, Suspension and Wheel Hubs, Front, p 04–01–2.

* cited by examiner

Primary Examiner—J. J. Swann
Assistant Examiner—F. Zeender
(74) Attorney, Agent, or Firm—John E. Kajander

(57) ABSTRACT

A stabilizer bar apparatus for use in a suspension of a motor vehicle includes a hollow tubular member (22) having first and second arms (24,26) disposed at opposite ends of a center section (28). The center section is adapted to be rotatably attached to a chassis and the first and second arms are adapted to attach to first and second wheel suspensions, respectively. A first radial protrusion (38) is circumferentially formed on an outer surface of the hollow tubular member and extends radially outward from the outer surface to a first predetermined height sufficient to retain the stabilizer bar under lateral loading. Additionally, a stress dispersing formation is (46) formed on an inner surface of the hollow tubular member opposite the first radial protrusion so as to disperse stress that would otherwise concentrate in the hollow tubular member adjacent to the first radial protrusion.

3 Claims, 3 Drawing Sheets

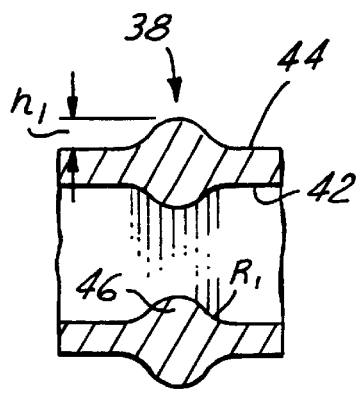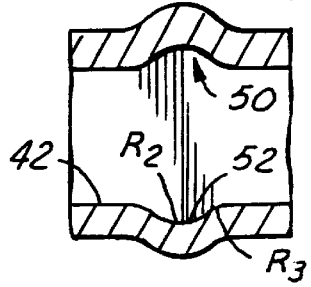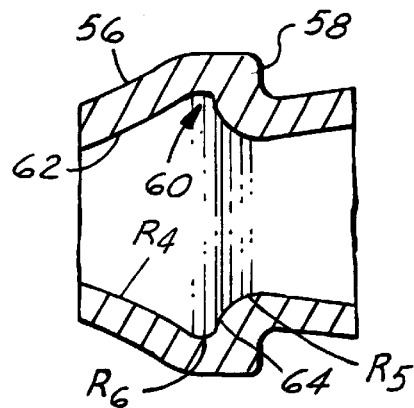
FIG.4   FIG.5   FIG.6
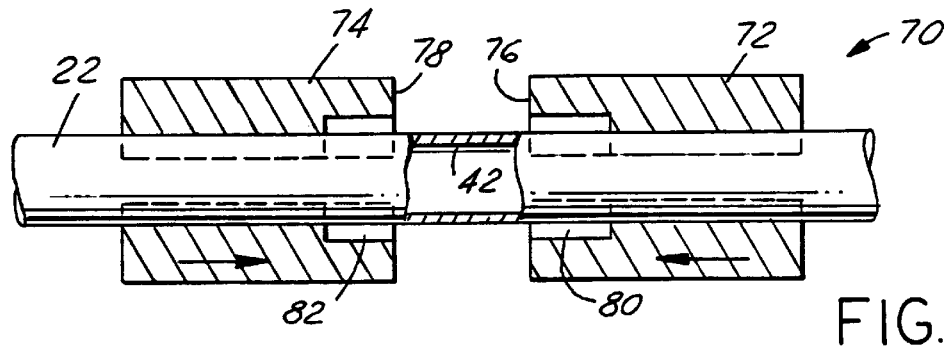
FIG.7
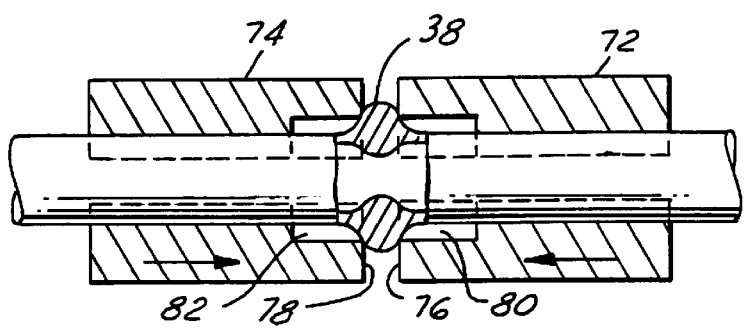
FIG.8
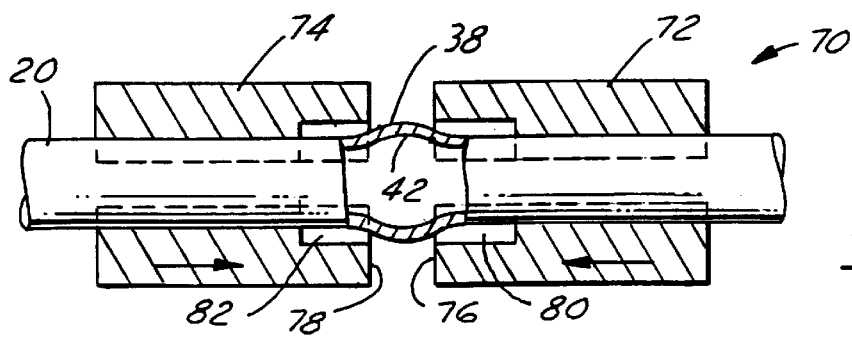
FIG.9

STABILIZER BAR APPARATUS FOR USE IN A VEHICLE SUSPENSION

BACKGROUND OF THE INVENTION

1. Field of the Invention

The present invention relates generally to stabilizer bars as used in suspensions for motor vehicles. More particularly the present invention relates to an improved stabilizer bar construction which is lighter and less expensive than previous stabilizer bars providing equivalent functionality.

2. Disclosure Information

It is well known to incorporate integrally forged, radially protruding retention rings on solid stabilizer bars as used in motor vehicle suspensions. The integral retention rings eliminate the need to install separate and costly retention collars, as well as the equipment and labor to install them. Finally, the integral retention rings do not have to be aligned by an operator or in service.

It has also been well known to utilize hollow tubular bars for stabilizer bars to provide a lightweight alternative to solid stabilizer bars. The industry norm for providing lateral retention on hollow stabilizer bars has been to use the more complex and costly retention collars. The additional cost of the retention collars has been considered by the industry to be a necessary compromise to obtain the weight benefits of a lightweight hollow stabilizer bar. The incorporation of integrally forged, radially protruding retention rings on hollow stabilizer bars has been rejected due to the likelihood that the forging process would form a stress riser, as illustrated by area A in FIG. 1, reducing the fatigue performance of the hollow stabilizer bars. This would in turn require thicker hollow stabilizer bars, diminishing the weight benefits originally sought when selecting the hollow bar over a solid bar.

For these reasons, it would be desirable to provide a stabilizer apparatus constructed from a hollow tubular member and incorporating an integral retention ring to provide a lightweight, cost effective alternative to the stabilizer bars currently available.

SUMMARY OF THE INVENTION

In response to this long felt need, the present invention provides an improvement over both existing solid and hollow stabilizer bars by providing a hollow tubular stabilizer bar having an integrally forged retention ring thereby allowing a lighter and lower cost unit than any of those known heretofore.

In accordance with the present invention, a stabilizer apparatus for use in a suspension of a motor vehicle has been discovered. The stabilizer bar apparatus includes a hollow tubular member having first and second arms disposed at opposite ends of a center section. The center section is adapted to be rotatably attached to a chassis and the first and second arms are adapted to attach to first and second wheel suspensions, respectively.

The stabilizer bar apparatus further includes a first radial protrusion circumferentially formed on an outer surface of the hollow tubular member. The first radial protrusion extends radially outward from the outer surface to a first predetermined height sufficient to allow the first radial protrusion to retain the stabilizer bar within its mounts to the chassis under lateral loading.

The stabilizer bar apparatus also includes a stress dispersing formation formed on an inner surface of the hollow tubular member opposite the first radial protrusion. This formation disperses stress that would otherwise concentrate in the hollow tubular member adjacent to the first radial protrusion.

It is an advantage of the present invention to provide a simpler, less expensive and lighter stabilizer bar than was previously available for use in motor vehicle suspensions.

BRIEF DESCRIPTION OF THE DRAWINGS

FIG. 4 is a partial sectional illustrating a hollow tubular member constructed in accordance with the present invention.

FIG. 5 is a partial sectional view illustrating a second embodiment of a hollow tubular member constructed in accordance with the present invention.

FIG. 6 is a partial sectional view illustrating a third embodiment of a hollow tubular member constructed in accordance with the present invention.

FIG. 7 is a partial sectional view illustrating tubular member loaded into a forming tool prior to being formed in accordance with the present invention.

FIG. 8 is a partial sectional view illustrating tubular member after being formed by a forming tool in accordance with the present invention.

FIG. 9 is a partial sectional view illustrating tubular member after being formed by a forming tool in accordance with a second embodiment of the present invention.

DETAILED DESCRIPTION OF THE PREFERRED EMBODIMENT

Figure 2:
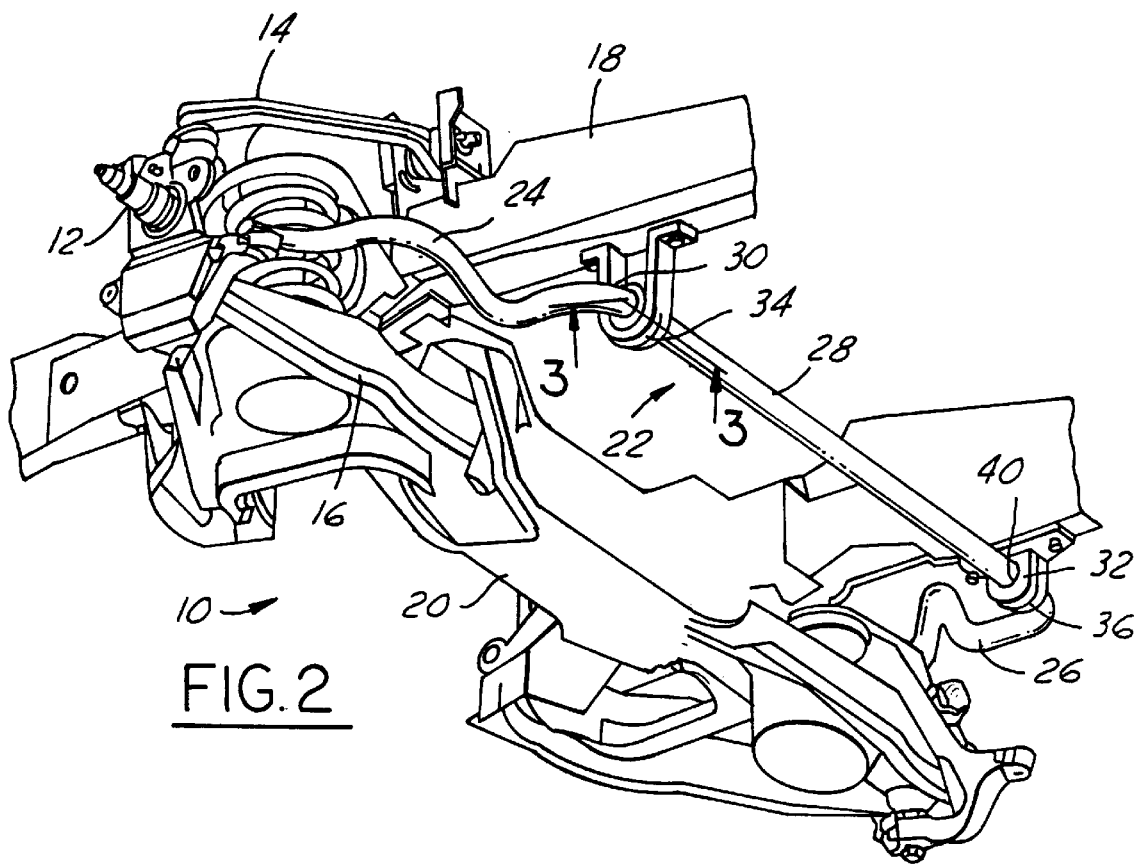
FIG. 2 is a perspective view of a frame and suspension for a motor vehicle incorporating a stabilizer bar in accordance with the present invention.

Referring now to FIG. 2, a typical vehicle suspension system 10 is shown including a wheel support member 12 for rotatably supporting a road wheel (not shown). For clarity and brevity, only the front left side of the suspension will be described, it being understood that the suspension is generally symmetric, with similar parts being found on a right side of the vehicle. Additionally, the present invention applies equally to front or rear suspensions. Upper and lower control arms 14, 16 are pivotally attached to a longitudinal frame member 18 of the vehicle chassis. A cross member 20 is shown interconnecting two longitudinal frame members.

It should also be noted that the present invention will be described in relation to a vehicle having body on frame construction, however, the present invention applies equally to a motor vehicle having a unibody structure wherein side rails, alone or in combination with a sub-frame, provide the structural support provided by the longitudinal frame members illustrated and they are constructed as integral components of the floor pan.

A stabilizer bar 22 includes first and second arms 24, 26 extending from opposite ends of a center section 28. The first and second arms 24, 26 attach to right and left suspensions, preferably to the wheel support member 12 as shown, or as far outboard on the lower control arms as possible. First and second bushings 30, 32 are rotatably affixed to the center section 28 of stabilizer bar 22 and supported from the longitudinal frame members by first and second clamps 34, 36. First and second radial protrusions 38 (see FIG. 3), 40 disposed inboard of the first and second bushings 30, 32 serve as assembly aids as well as to center the center section 28 laterally during operation.

Figure 1:
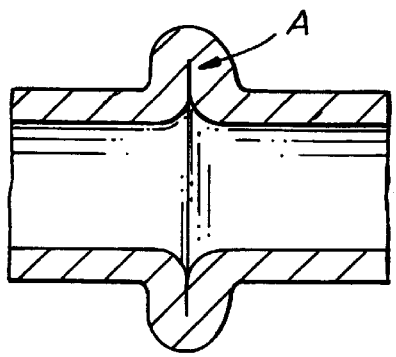
FIG. 1 is a sectional view taken from a hollow stabilizer bar illustrating stress risers eliminated by the present invention.
Figure 3:
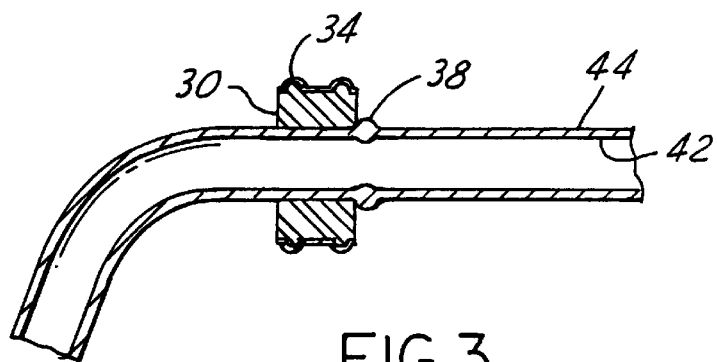
FIG. 3 is a partial sectional view taken along line 3—3 of FIG. 2 illustrating a hollow tubular member constructed in accordance with the present invention.

Referring now to FIGS. 3 and 4, the stabilizer bar 22 is preferably constructed using a hollow tubular member having an inner surface 42 and an outer surface 44 and predetermined outer diameter and thickness determined depending on specific vehicle characteristics, as is well known to those skilled in the art. The first radial protrusion 38 takes the form of a ring around the entire circumference of the outer surface 44 of the hollow tubular member. The first radial protrusion 38 extends radially outward from the outer surface a predetermined height, $h_1$, sufficient to maintain the tubular member relative to the bushing 34.

The stabilizer bar 22 also includes a formation on the inner surface of the hollow tubular member adjacent to, or opposite from, the first radial projection 38 having a geometric shape that reduces or disperses stress that might otherwise concentrate in this region under repeated torsional loading of the tubular member. In the first embodiment illustrated, this formation takes the shape of a second radial protrusion 46 extending radially inward around the entire circumference of the inner surface 42 of the hollow tubular member. The second radial protrusion 46 may be of similar width and height as the first radial protrusion 38, however it is not necessary. The second radial protrusion 46 further includes a first radius, $R_1$, in establishing the transition between the inner surface of the hollow tubular member and second radial protrusion 46. The first radius, $R_1$, should be greater than a first predetermined minimum dimension to prevent stress from concentrating in the hollow tubular member adjacent to the first and second radial protrusions. The first predetermined minimum dimension should be determined for a given vehicle and tubular member thickness and diameter.

Referring now to FIG. 5, an alternative embodiment is illustrated, wherein the formation takes the shape of a first circumferential channel 50 extending radially outward around the entire circumference of the inner surface 42 of the hollow tubular member. The first circumferential channel 50 includes an arcuate bottom surface 52 characterized by a second radius, $R_2$, having a second predetermined minimum dimension. A third radius $R_3$, located between the inner surface 42 of the hollow tubular member and the arcuate bottom surface 52 also has a third predetermined minimum dimension. The second and third predetermined minimum dimensions should be determined for a given vehicle and tubular member thickness and diameter so as to prevent stress from concentrating in the hollow tubular member adjacent to the first and second radial protrusions.

Referring now to FIG. 6, yet another alternative embodiment is illustrated, wherein the first radial protrusion 38 includes a ramp portion 56 gradually departing outwardly from the outer surface 44 of the hollow tubular member. In the presently preferred embodiment, the ramp departure angle is approximately forty-five degrees. The ramp portion 56 terminates at the intersection with a wall portion 58 extending outwardly and substantially normal to the outer surface 44 of the hollow tubular member.

The formation for the embodiment illustrated in FIG. 6 takes the shape of a second circumferential channel 60 extending radially outward around the entire circumference of the inner surface 42 of the hollow tubular member. The second circumferential channel 60 includes a first side 62 substantially parallel to the ramp portion 56 and a second side 64 substantially parallel to the wall portion 58 and is characterized by fourth, fifth and sixth radii, $R_4$, $R_5$, $R_6$. The fourth radius, $R_4$, is located between the inner surface 42 of the hollow tubular member and the first side 62 and has a fourth predetermined minimum dimension. The fifth radius, $R_5$, is located between the inner surface 42 of the hollow tubular member and the second side 64 and has a fifth predetermined minimum dimension. The sixth radius, $R_6$, is located between the first side 62 and the second side 64 and has a sixth predetermined minimum dimension. The fourth, fifth and sixth predetermined minimum dimensions should be determined for a given vehicle and tubular member thickness and diameter so as to prevent stress from concentrating in the hollow tubular member adjacent to the first and second radial protrusions.

Figure 10:
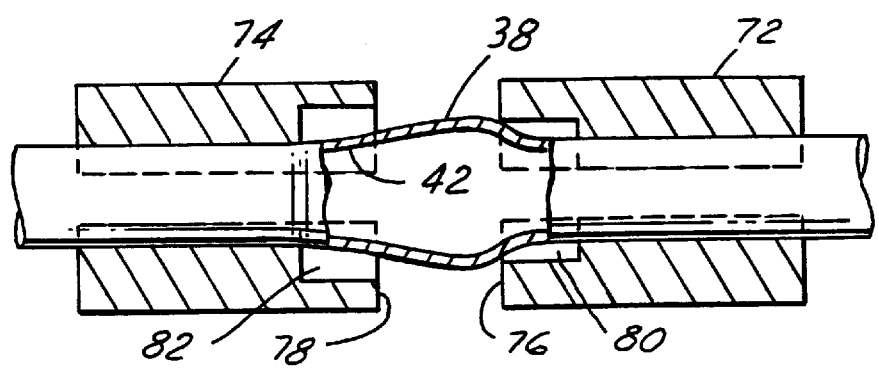
FIG. 10 is a partial sectional view illustrating tubular member after being partially formed by a forming tool in accordance with a third embodiment of the present invention.
Figure 11:
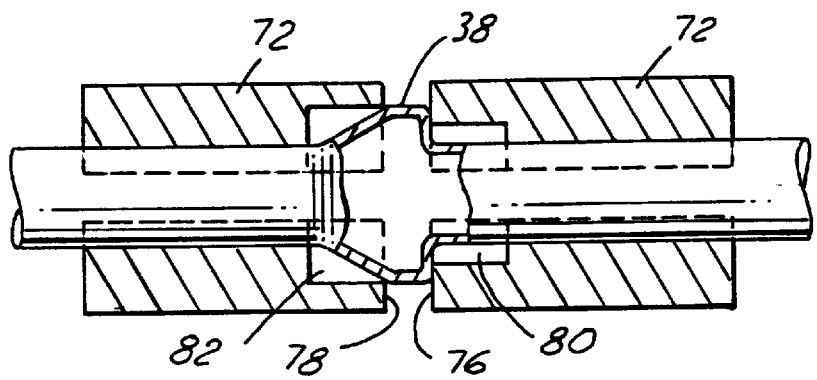
FIG. 11 is a partial sectional view illustrating tubular member after being formed by a forming tool in accordance with a third embodiment of the present invention.

Referring now to FIGS. 7–11, a method of forming a stabilizer bar in accordance with the principles of the present invention will now be described. The hollow tubular member 22 is loaded and clamped into a tool 70 having two axially movable platens 72, 74. The platens clamp the hollow tubular member with sufficient force to prevent movement of the platens relative to the tubular member during the forming operation. The facing ends 76, 78 of the platens include over-bored regions 80, 82 having a predetermined diameter and depth depending on which embodiment is desired. FIGS. 10 and 11 show that one is over-bored larger than the other in order to form the third embodiment described above and shown in FIG. 6.

Generally, once clamped as shown in FIG. 6, a dc current is conducted through the hollow tubular member 22 between the platens, which preferably are also operative as electrodes, sufficient to reach a preferred forging temperature of approximately 1700 degrees Fahrenheit. While heated, the platens are stroked toward one another a predetermined distance, as in FIGS. 8–11, again depending on the embodiment desired and the diameter and thickness of the bar. The tube bulges forming the first radial protrusion 38 and the desired formation on the inner surface 42 of the hollow tubular member.

It is generally desirable to form the hollow tubular member 22 from a seam welded tubular member, although, a seamless DOM tubular member as well as a tubular member formed by other known manufacturing techniques would provide equivalent operability. In the presently preferred embodiment of the invention, the tubular member is constructed from steel such as SAE 4130 and having an outer diameter in the range of 18 mm–50 mm and a thickness in the range of 10%–25% of the outer diameter.

Various modifications and variations will no doubt occur to those skilled in the art to which this invention pertains. For instance, various methods for forming the formations on the inside of the tubular member may occur to those skilled in the art upon reading this disclosure. The description above was provided for completeness, but is by no means intended to limit the scope of the present invention. These and all other variations which basically rely on the teachings by which this disclosure has advanced the art are properly considered within the scope of this invention as defined by the appended claims.

We claim:

1. A stabilizer bar apparatus for use in a suspension of a motor vehicle, said stabilizer bar apparatus comprising:

a hollow tubular member having first and second arms disposed at opposite ends of a center section, said center section being adapted to be rotatably attached to a chassis and said first and second arms being adapted to attach to first and second wheel suspensions;

a first radial protrusion circumferentially formed on an outer surface of said hollow tubular member, said first radial protrusion extending radially outward from said outer surface to a first predetermined height, said first radial protrusion further comprises a ramp portion gradually departing from said outer surface and intersecting a wall portion extending outward and substantially normal to said outer surface to said first predetermined height; and stress dispersing means formed on an inner surface of said hollow tubular member opposite said first radial protrusion, said means for dispersing stress otherwise concentrated in said hollow tubular member adjacent to said first radial protrusion, said stress dispersing means further comprises a first circumferential channel formed on an inner surface of said hollow tubular member, said first circumferential channel having a first side parallel to said ramp portion and a second side parallel to said wall portion;

wherein said first circumferential channel further comprises:

a first radius between said inner surface of said hollow tubular member and said first side of said first circumferential channel, said first radius having a first predetermined minimum dimension;

a second radius between said inner surface of said hollow tubular member and said second side of said first circumferential channel, said second radius having a second predetermined minimum dimension; and a third radius between said first side of said first circumferential channel and said second side of said first circumferential channel, said third radius having a third predetermined minimum dimension so as to prevent stress from concentrating in said hollow tubular member adjacent to said first radial protrusion.

2. A stabilizer bar apparatus for use in a motor vehicle having a chassis and a suspension, said stabilizer apparatus comprising:

a hollow tubular member having first and second arms disposed at opposite ends of a center section, said first and second arms being attached to first and second suspension;

first and second bushings rotatably disposed on said center section of said hollow tubular member and being securely clamped to said chassis;

a first and second radial protrusions circumferentially formed on an outer surface of said center section of said hollow tubular member adjacent to said first and second bushings, said first and second radial protrusions extending radially outward from said outer surface to a first predetermined height; and stress dispersing means formed on an inner surface of said hollow tubular member directly opposite said first and second radial protrusions, said means for dispersing stress otherwise concentrated in said hollow tubular member adjacent to said first and second radial protrusions, wherein said stress dispersing means further comprises respective third and fourth radial protrusions circumferentially formed on an inner surface of said hollow tubular member, said third and fourth radial protrusions respectively extending radially inward directly opposite said first and second radial protrusions from said inner surface, wherein said stress dispersing means further comprises a first radius and a second radius respectively between said inner surface of said hollow tubular member and said third and fourth radial protrusions, said first radius and said second radius having a first predetermined minimum dimension so as to prevent stress from concentrating in said hollow tubular member adjacent to said first radial protrusion and said second radial protrusion.

3. A stabilizer bar apparatus for use in a motor vehicle having a chassis and a suspension, said stabilizer apparatus comprising:

a hollow tubular member having first and second arms disposed at opposite ends of a center section, said first and second arms being attached to first and second suspension;

first and second bushings rotatably disposed on said center section of said hollow tubular member and being securely clamped to said chassis;

a plurality of radial protrusions circumferentially formed on an outer surface of said center section of said hollow tubular member adjacent to said first and second bushings, each of said radial protrusions extending radially outward from said outer surface to a first predetermined height, wherein said radial protrusions comprises a ramp portion gradually departing from said outer surface and intersecting a wall portion extending outward and substantially normal to said outer surface to said first predetermined height; and a plurality of stress dispersing means formed on an inner surface of said hollow tubular member opposite each of said radial protrusions, said means for dispersing stress otherwise concentrated in said hollow tubular member adjacent to each of said radial protrusions, wherein said each of said stress dispersing means further comprise a first circumferential channel formed on an inner surface of said hollow tubular member, said first circumferential channel having a first side parallel to said ramp portion and a second side parallel to said wall portion, wherein said first circumferential channel further comprises:

a first radius between said inner surface of said hollow tubular member and said first side of said first circumferential channel, said first radius having a first predetermined minimum dimension;

a second radius between said inner surface of said hollow tubular member and said second side of said first circumferential channel, said second radius having a second predetermined minimum dimension; and a third radius between said first side of said first circumferential channel and said second side of said first circumferential channel, said third radius having a third predetermined minimum dimension so as to prevent stress from concentrating in said hollow tubular member adjacent to said plurality of radial protrusions.

* * * * *